United States Patent
Katsura

(10) Patent No.: US 11,821,583 B2
(45) Date of Patent: Nov. 21, 2023

(54) MONITORING SYSTEM

(71) Applicant: ECO FIRST Co., Ltd., Tokyo (JP)

(72) Inventor: Tsutomu Katsura, Tokyo (JP)

(73) Assignee: ECO FIRST Co., Ltd., Tokyo (JP)

( * ) Notice: Subject to any disclaimer, the term of this patent is extended or adjusted under 35 U.S.C. 154(b) by 627 days.

(21) Appl. No.: 17/069,993

(22) Filed: Oct. 14, 2020

(65) Prior Publication Data

US 2021/0071814 A1    Mar. 11, 2021

Related U.S. Application Data

(63) Continuation of application No. PCT/JP2019/016341, filed on Apr. 16, 2019.

(30) Foreign Application Priority Data

Apr. 17, 2018   (JP) ................. 2018-079460

(51) Int. Cl.
*F16T 1/48*        (2006.01)
*G01J 5/00*        (2022.01)
(Continued)

(52) U.S. Cl.
CPC .............. *F16T 1/48* (2013.01); *G01J 5/0003* (2013.01); *G01J 5/28* (2013.01); *G01K 11/12* (2013.01); *F16T 1/24* (2013.01); *F16T 1/34* (2013.01)

(58) Field of Classification Search
CPC ....... F16T 1/48; F16T 1/24; F16T 1/34; G01J 5/0003; G01J 5/28; G01K 11/12
(Continued)

(56) References Cited

U.S. PATENT DOCUMENTS

| | | | | |
|---|---|---|---|---|
| 2,051,732 A | * | 8/1936 | McKee | F16T 1/16 251/117 |
| 2,936,772 A | * | 5/1960 | Kinderman | F16T 1/10 251/285 |

(Continued)

FOREIGN PATENT DOCUMENTS

| | | |
|---|---|---|
| JP | S51-079025 B | 7/1976 |
| JP | S55-90898 U | 6/1980 |

(Continued)

OTHER PUBLICATIONS

International Search Report issued with PCT Application No. PCT/JP2019/016341 dated Jul. 2, 2019.
(Continued)

*Primary Examiner* — Minh Q Le
(74) *Attorney, Agent, or Firm* — Manatt, Phelps & Phillips, LLP

(57) ABSTRACT

A monitoring system is disclosed. The monitoring system comprises: a nozzle steam trap (3) including a supply portion (10) into which water vapor is supplied, and a discharge portion (11) which discharges liquid water contained in the water vapor; a temperature measurer (20) that measures a temperature of the discharge portion; a transmitter (24) that transmits temperature information containing the temperature measured by the temperature measurer; a receiver (7) that receives the temperature information; a determiner (8) that determines whether an abnormality is present in the nozzle steam trap based on the temperature information; and a notifier (9) that issues a notice when the determiner determines that the abnormality is present. A first discharge-side reference temperature lower than the boiling point of the water and a second discharge-side reference temperature higher than the boiling point of the water are set for the discharge portion. The determiner determines that the abnormality is present when the temperature of the dis- (Continued)

charge portion contained in the temperature information is lower than the first discharge-side reference temperature or higher than the second discharge-side reference temperature.

20 Claims, 18 Drawing Sheets

(51) Int. Cl.
  *G01J 5/28* (2006.01)
  *G01K 11/12* (2021.01)
  *F16T 1/34* (2006.01)
  *F16T 1/24* (2006.01)

(58) Field of Classification Search
  USPC .................. 137/177, 183, 179, 182; 55/466
  See application file for complete search history.

(56) References Cited

U.S. PATENT DOCUMENTS

| | | | | |
|---|---|---|---|---|
| 3,162,208 A * | 12/1964 | Curatola | ................. | F16T 1/165 251/363 |
| 3,302,878 A * | 2/1967 | Fujiwara | ................... | F16T 1/10 236/56 |
| 3,512,544 A * | 5/1970 | Milton | ..................... | F16T 1/165 137/183 |
| 3,664,363 A * | 5/1972 | Miyawaki | ................ | F16T 1/165 137/183 |
| 4,073,306 A * | 2/1978 | Neyer | ....................... | F16T 1/12 236/59 |
| 4,171,209 A * | 10/1979 | Brown | ..................... | F16L 55/09 210/450 |
| 4,426,213 A * | 1/1984 | Stavropoulos | ............ | F16T 1/34 138/44 |
| 4,745,943 A * | 5/1988 | Mortensen | ................. | F16T 1/34 138/44 |
| 4,764,024 A * | 8/1988 | Ryan | ....................... | G01N 25/60 237/67 |
| 5,060,686 A * | 10/1991 | Troy | ........................ | F16T 1/34 138/44 |
| 5,120,336 A * | 6/1992 | LeBlanc | .................... | F16T 1/34 55/466 |
| 5,137,556 A * | 8/1992 | Koulogeorgas | ........ | B01D 46/24 96/194 |
| 5,628,339 A * | 5/1997 | Isringhausen | ......... | F16L 41/023 137/883 |
| 5,632,300 A * | 5/1997 | Isringhausen | ........... | F16L 55/07 137/883 |
| 6,035,882 A * | 3/2000 | Brint | ........................ | F16T 1/48 236/94 |
| 6,148,844 A * | 11/2000 | Stamatakis | ............. | F16T 1/165 137/183 |
| 6,332,112 B1 | 12/2001 | Shukunami | | |
| 7,155,363 B1 * | 12/2006 | Rosenthal | ................. | G01J 5/60 702/135 |
| 7,316,241 B1 * | 1/2008 | Sharp, Jr. | ................ | F16T 1/165 137/183 |
| 9,157,829 B2 * | 10/2015 | Spasova | ................... | G01M 3/16 |
| 10,641,412 B2 * | 5/2020 | Karschnia | ............... | F16K 37/00 |
| 2005/0063453 A1 * | 3/2005 | Camm | ............. | H01L 21/67276 374/161 |
| 2008/0150737 A1 * | 6/2008 | Karschnia | ............. | F22B 37/428 340/605 |
| 2009/0044867 A1 * | 2/2009 | Chiang | ..................... | F16T 1/38 137/182 |
| 2013/0118614 A1 * | 5/2013 | Mcfeeters | ................. | F16T 1/48 137/551 |
| 2016/0146399 A1 | 5/2016 | Katsura | | |
| 2017/0227213 A1 * | 8/2017 | Fujiwara | ................... | F16T 1/48 |
| 2018/0101155 A1 | 4/2018 | Hagihara | | |
| 2021/0003251 A1 * | 1/2021 | Katsura | ..................... | F16T 1/16 |
| 2021/0033245 A1 * | 2/2021 | Wingerath | ............... | F16T 1/48 |
| 2022/0043438 A1 * | 2/2022 | Nakanishi | ............... | F01D 21/12 |

FOREIGN PATENT DOCUMENTS

| | | |
|---|---|---|
| JP | H4-125396 A | 4/1992 |
| JP | H6-129600 A | 5/1994 |
| JP | H10-115560 A | 5/1998 |
| JP | 2000-035378 A | 2/2000 |
| JP | 2001-317688 A | 11/2001 |
| JP | 2003-130289 A | 5/2003 |
| JP | 2005-300458 A | 10/2005 |
| JP | 2010-43700 A | 2/2010 |
| JP | 2013-64434 A | 4/2013 |
| JP | 3184441 U | 6/2013 |
| JP | 2016-080002 A | 5/2016 |
| JP | 2016-205461 A | 12/2016 |
| JP | 2017-211026 A | 11/2017 |
| WO | 2015/016298 A1 | 2/2015 |
| WO | 2016/186118 A1 | 11/2016 |

OTHER PUBLICATIONS

Written Opinion issued with PCT Application No. PCT/JP2019/016341 dated Jul. 2, 2019.

* cited by examiner

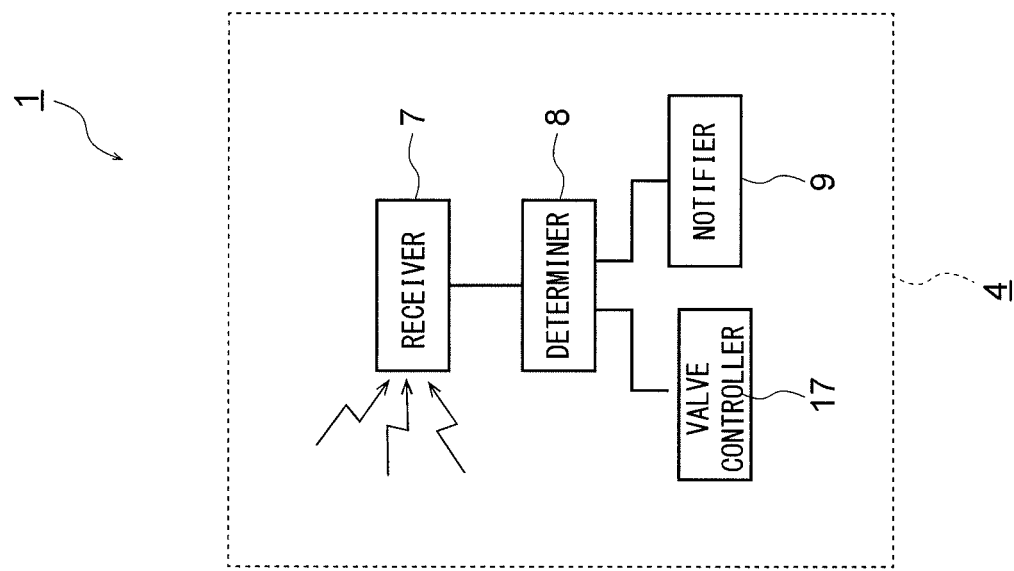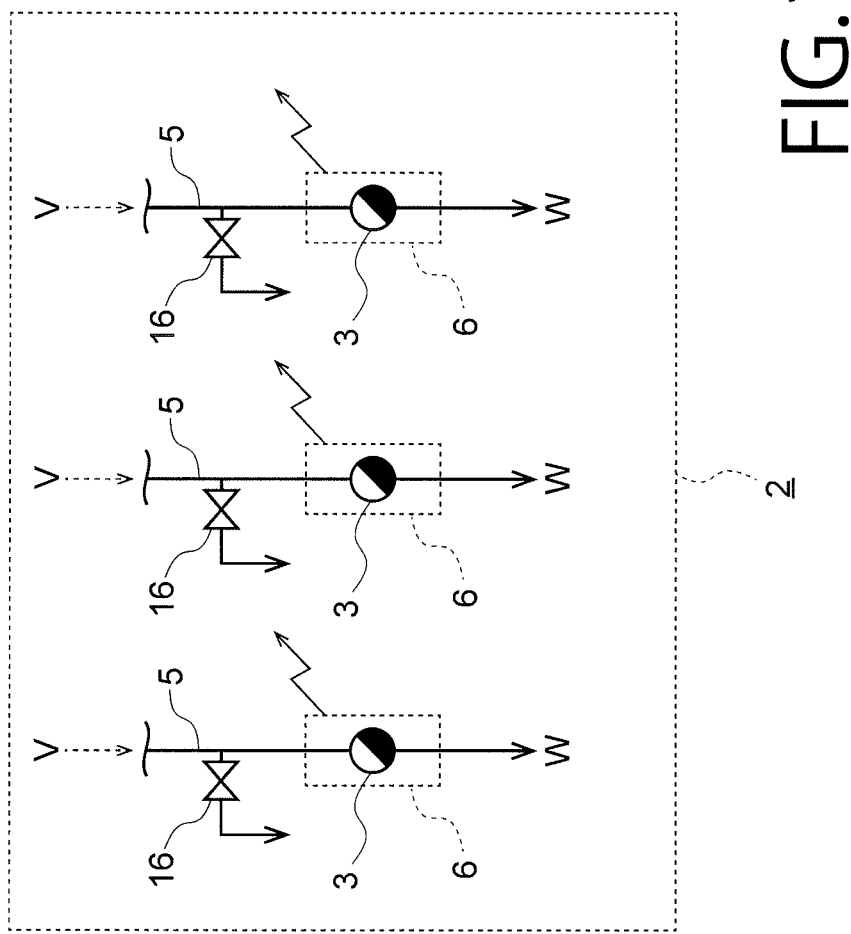
FIG.1

|  | temperature of discharge portion 11 > second reference temperature T2 | temperature of discharge portion 11 ≦ second reference temperature T2 |
|---|---|---|
| temperature of supply portion 10 < first reference temperature T1 | abnormal | abnormal |
| temperature of supply portion 10 ≧ first reference temperature T1 | abnormal | normal |

FIG.9

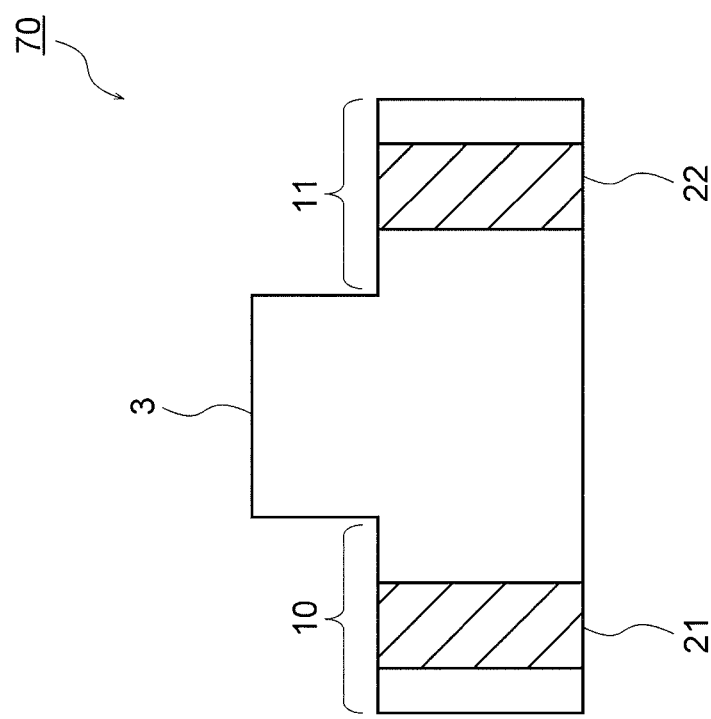

MONITORING SYSTEM

CROSS-REFERENCE TO RELATED APPLICATIONS

This application is a continuation to International Application Serial No. PCT/JP 2019/016341, filed Apr. 16, 2019, which claims priority to Japanese Patent Application No. 2018-079460, filed Apr. 17, 2018. The contents of these applications are incorporated herein by reference in their entirety.

BACKGROUND

Technical Field

The present invention relates to a monitoring system.

Background Art

In a steam line using steam, heat is supplied to a plant by means of the steam. If condensed water (drain water) accumulates in this steam line, it blocks the supply of heat. Thus, in order to prevent this, a steam trap is provided in the steam line. The steam trap serves to discharge the liquid drain water selectively from the water vapor flowing in piping to the outside of the line.

If this steam trap breaks, the steam trap will be disabled from holding (trapping) the vapor and a large amount of the vapor will leak from the steam trap. Instead, if the steam trap is clogged, the drain water will stay inside the steam trap. This not only makes it difficult to supply heat to the plant but also leads to a steam hammer phenomenon in which the hot water vapor contacts the drain water, thereby abruptly changing its own volume and pressure and destroying the piping.

Having a worker inspect whether an abnormality is present in the steam trap provided in the steam line on a daily basis is a conceivable way to avoid such a trouble (see WO2016/186118, JP2001-317688, JP2000-035378). However, large-scale factories such as steel-making factories and paper-making factories are provided with a large number of steam traps. Inspecting each of the steam traps scattered in such a factory is a burden on the worker.

In addition, it is difficult to determine whether an abnormality is present in a steam trap from outside the piping. Also, although there are inspection instruments for inspecting whether an abnormality is present, the criteria with which these inspection instruments make a determination may be ambiguous, and thus the accuracy of inspection work may be questionable.

Meanwhile, a technique in which the temperature of a steam trap is observed by using a temperature label (see JP2013-64434) has been proposed. However, this case also requires a worker to perform inspections by walking around the factory, and thus cannot reduce the burden on the worker.

SUMMARY

An object of the present disclosure is to provide a monitoring system that facilitates inspection of a steam trap.

One aspect provides a monitoring system comprising: a steam trap including a supply portion into which water vapor is supplied, and a discharge portion which discharges liquid water contained in the water vapor; a temperature measurer that measures a temperature of at least the discharge portion; a transmitter that transmits temperature information containing the temperature measured by the temperature measurer; a receiver that receives the temperature information; a determiner that determines whether an abnormality is present in the steam trap based on the temperature information; and a notifier that issues a notice when the determiner determines that the abnormality is present.

According to the one aspect, the transmitter transmits temperature information to the receiver, and the determiner determines whether an abnormality is present in the steam trap based on this temperature information. In this way, a worker does not need to inspect the steam trap himself or herself in the field. This can reduce the burden on the worker and facilitate inspection of the steam trap.

BRIEF DESCRIPTION OF DRAWINGS

FIG. 1 is a system configuration diagram of a monitoring system according to a first embodiment.

FIG. 9 is a diagram illustrating a determination table with which a determiner determines whether an abnormality is present based on a first reference temperature and a second reference temperature in the first embodiment.

FIG. 18 is a cross-sectional view of a component according to a fifth embodiment.

DETAILED DESCRIPTION

Figure 2:
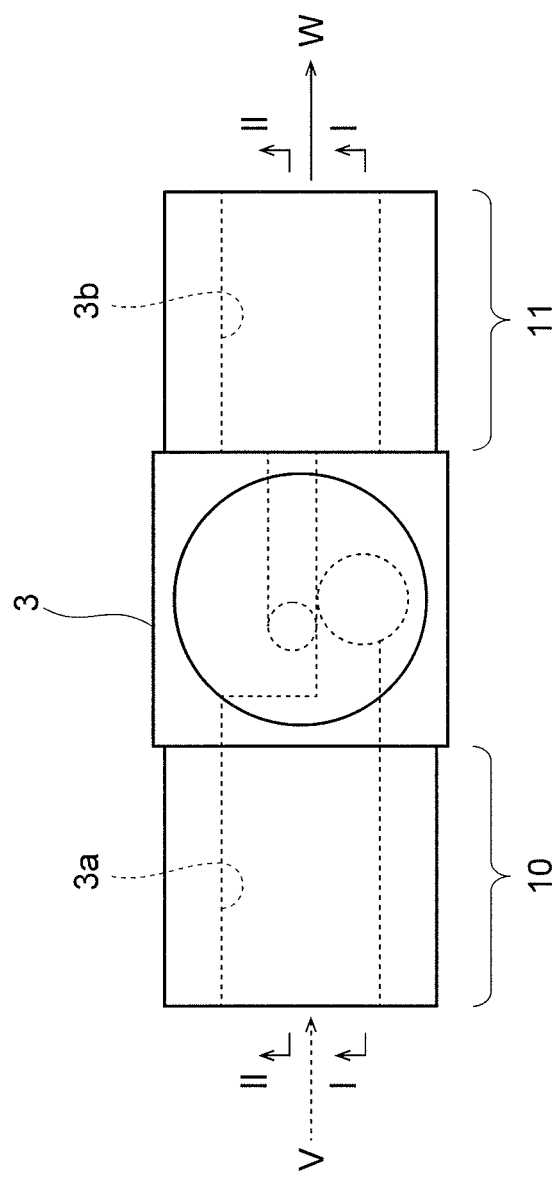
FIG. 2 is a top view of a steam trap according to the first embodiment.

Embodiments will be described below with reference to the accompanying drawings.

First Embodiment

FIG. 1 is a system configuration diagram of an exemplary monitoring system 1 according to this embodiment. This monitoring system 1 is a system that monitors steam traps 3 provided in a factory 2, and has a monitoring unit 4 that monitors the steam traps 3 for abnormalities.

A plurality of pipes 5 are installed in the factory 2 and each of them is provided with a steam trap 3 and a release valve 16. While the function of the pipes 5 is not particularly limited, steam pipes through which water vapor V used in, for example, a heat exchanger, flows can be used as the pipes 5. Also, examples of the factory 2 include a paper-making factory, a steel-making factory, a semiconductor factory, and so on.

Each steam trap 3 separates liquid water from the water vapor V flowing through the pipe 5, and discharges this water as drain water W. Also, the release valve 16 is a solenoid valve that, if drain water W accumulates in the pipe 5 due to the occurrence of an abnormality in the steam trap 3, releases this drain water W to the outside of the pipe 5. The steam trap 3 is provided with a transmission unit 6 that wirelessly transmits temperature information containing the temperature of the steam trap 3 to the monitoring unit 4.

The standard for the wireless transmission is not particularly limited. For example, the transmission unit 6 may perform the wireless transmission in accordance with a near-field communication standard such as ZIGBEE (registered trademark), Bluetooth (registered trademark), or iBeacon (registered trademark). Further, a wireless LAN (Local Area Network) may be employed instead of near-field communication.

On the other hand, the monitoring unit 4 includes a receiver 7, a determiner 8, a notifier 9, and a valve controller 17. Of these, the receiver 7 receives the temperature information wirelessly transmitted from the transmission unit 6 with a reception antenna, and notifies the determiner 8 of the temperature information.

Based on the temperature information, the determiner 8 determines whether an abnormality is present in the steam trap 3, and notifies the notifier 9 of the result of this determination. The hardware configuration of the determiner 8 is not particularly limited. For example, the determiner 8 can be implemented with a processor such as a CPU (Central Processor Unit) and a memory cooperating with each other to execute a program.

If receiving a determination result indicating the presence of an abnormality from the determiner 8, the notifier 9 issues a notice with a screen or sound indicating the presence of the abnormality in the steam trap 3. In one example, a liquid crystal display or a speaker can be used as the notifier 9. Alternatively, a mobile terminal such as a smartphone or a PHS (Personal Handy-Phone System) may be used as the notifier 9. In this case, the determiner 8 wirelessly transmits the determination result indicating the presence of the abnormality to such a mobile terminal.

Note that when a plurality of steam traps 3 are present as in this example, the determiner 8 may notify the notifier 9 of an identifier identifying a steam trap 3 with an abnormality, and the notifier 9 may issue a notice indicating only the steam trap 3 with the abnormality among the plurality of steam traps 3. Such an identifier is, for example, an identification number assigned to each steam trap 3 by the administrator of the monitoring system 1.

Meanwhile, when the determiner 8 determines that an abnormality is present in a steam trap 3, the valve control part 17 controls the release valve 16 to open the release valve 16 and release liquid water W to the outside of the pipe 5.

FIG. 2 is a top view of an exemplary steam trap 3. The steam trap 3 is a nozzle steam trap made of a corrosion-resistant metal, such as stainless steel, and has a supply portion 10 which is connected to the pipe 5 (see FIG. 1) and into which water vapor V is supplied, and a discharge portion 11 which discharges the liquid water W contained in the water vapor V.

Moreover, the supply portion 10 is provided therein with a supply channel 3a through which the water vapor V flows, and the discharge portion 11 is provided therein with a discharge channel 3b through which the water W flows.

Figure 3:
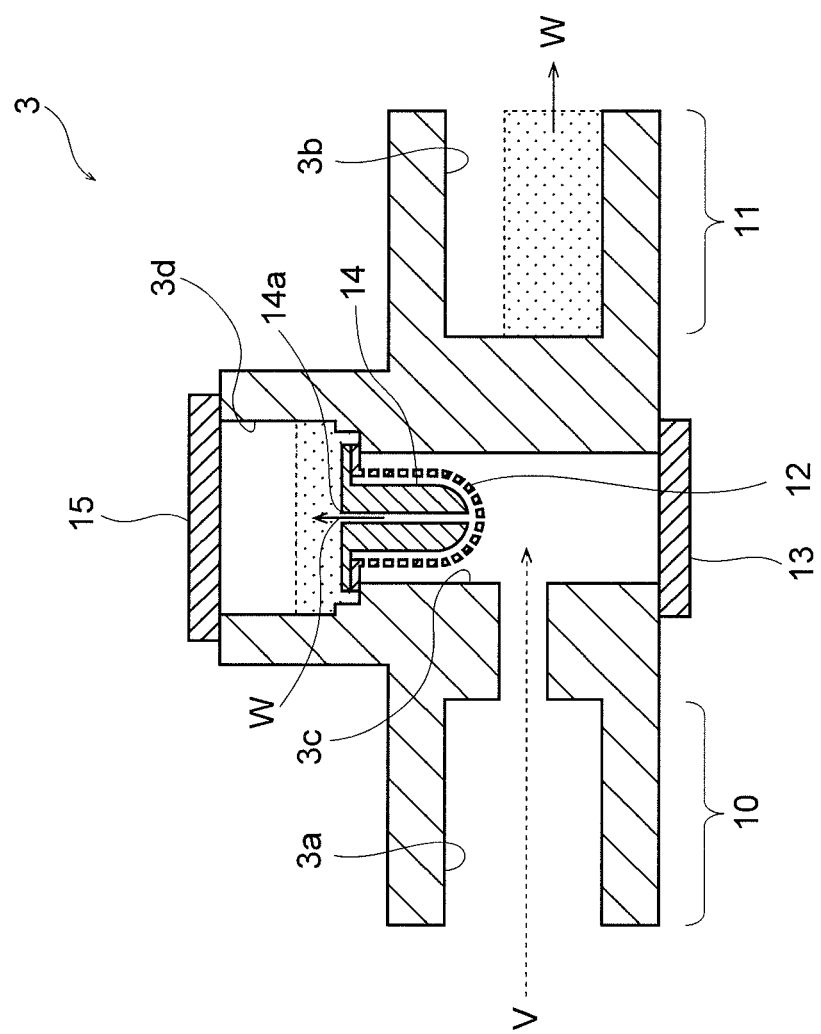
FIG. 3 is a cross-sectional view of the steam trap taken along the line I-I of FIG. 2.

FIG. 3 is a cross-sectional view of the steam trap 3 taken along the line I-I of FIG. 2. As illustrated in FIG. 3, inside the steam trap 3 is provided a cavity 3c communicating with the above-mentioned supply channel 3a. The cavity 3c has a cylindrical shape extending vertically upward, with its lower end closed with a first end cap 13.

At the upper end of the cavity 3c, on the other hand, a strainer 12 for filtering out foreign matters such as rust contained in the vapor V is provided in a detachably attachable manner.

The shape and material of the strainer 12 are not particularly limited. In this example, a metal mesh through which a plurality of holes with a diameter of about 0.1 mm are formed is employed as the strainer 12.

The liquid water W having passed through the strainer 12 is guided to a nozzle 14 fixed at the upper end of the cavity 3c. The nozzle 14 has a function of removing the liquid water W from the vapor V by generating a pressure difference between a water storage portion 3d provided in the steam trap 3 and the cavity 3c, and has a nozzle hole 14a from which the water W and part of the vapor V are jetted.

The water storage portion 3d, on the other hand, serves to temporarily store the water W exiting the nozzle 14. In practice, the steam trap 3 is used in such an orientation that the water storage portion 3d is positioned above the cavity 3c.

Note that the upper end of the water storage portion 3d is closed with a second end cap 15. This prevents the water W from overflowing out of the water storage portion 3d.

Figure 4:
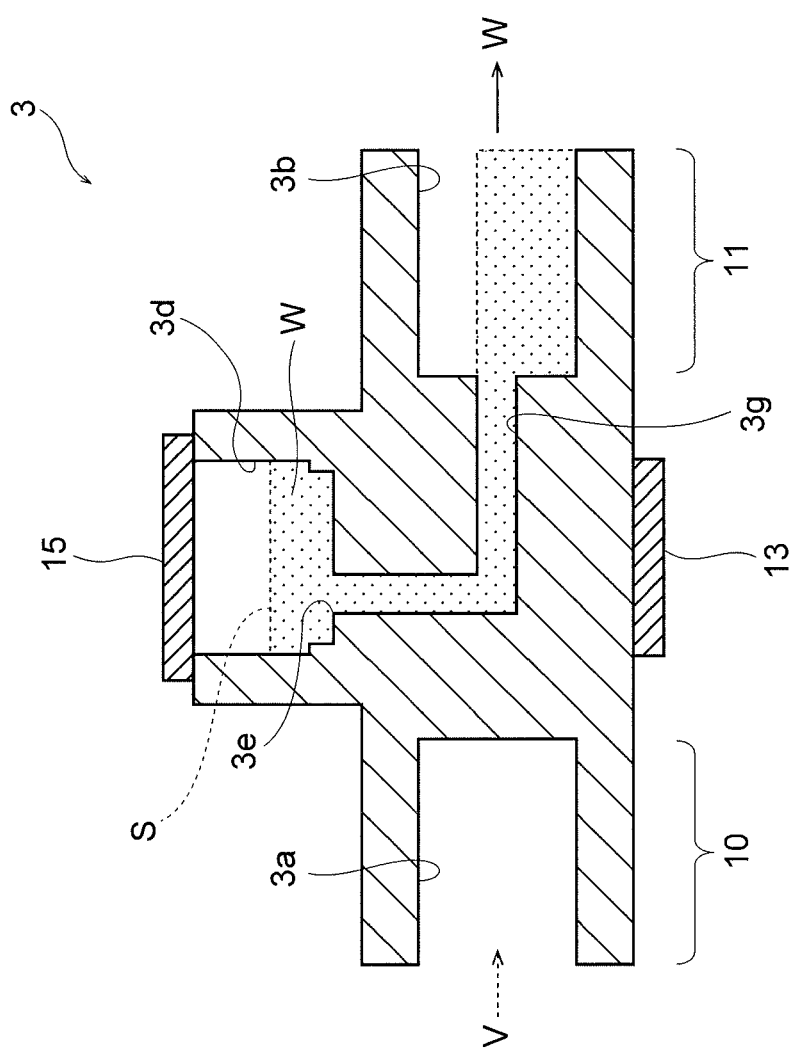
FIG. 4 is a cross-sectional view of the steam trap taken along the line II-II of FIG. 2.

FIG. 4 is a cross-sectional view of the steam trap 3 taken along the line II-II of FIG. 2. As illustrated in FIG. 4, in the water storage portion 3d, the water W is stored to an intermediate depth. Moreover, an opening 3e is provided at a position lower than a water surface S of the water W.

The opening 3e is connected to the discharge channel 3b by a connection channel 3g, so that the water W stored in the water storage portion 3d is discharged from the discharge portion 11 through the connection channel 3g.

Such a steam trap 3 has no movable portion and thus has good durability, which enables a long-term use of the steam trap 3 in a steel-making factory or a paper-making factory.

In addition, since the opening 3e is provided in the water storage portion 3d at a position lower than the water surface S, the water W seals the opening 3e. This can prevent the water vapor V from escaping to the discharge portion 11 through the opening 3e.

Figure 5:
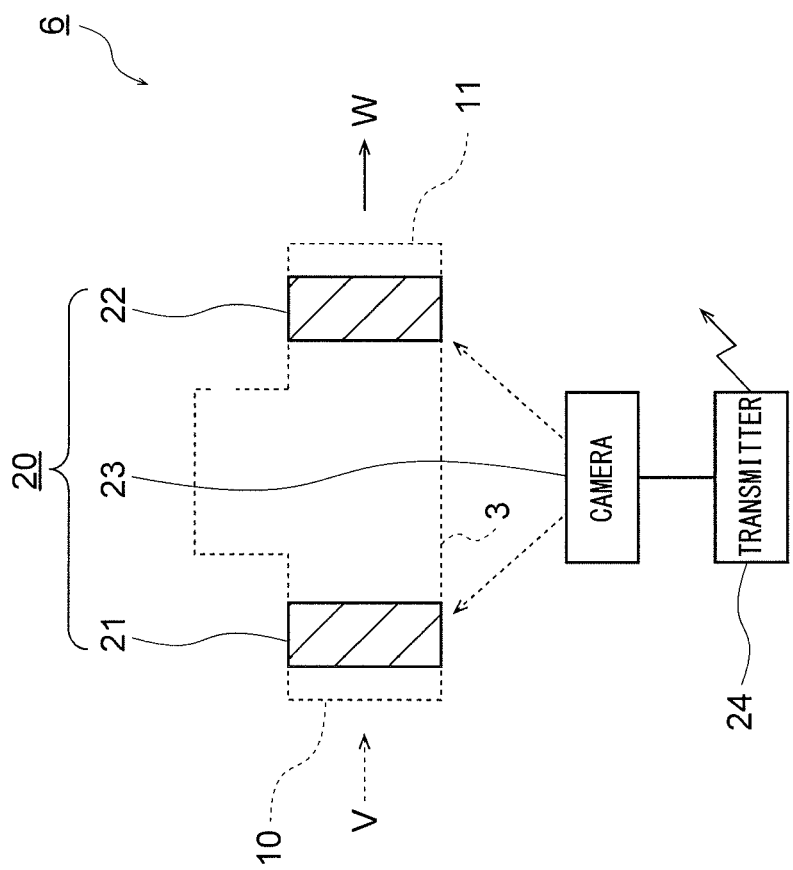
FIG. 5 is a configuration diagram of a transmission unit according to the first embodiment.

FIG. 5 is a configuration diagram of the transmission unit 6. The transmission unit 6 is a unit that wirelessly transmits the temperature information containing the temperature of the steam trap 3, as described earlier, and has a temperature measurer 20 and a transmitter 24.

Of these, the temperature measurer 20 comprises a first temperature indicator 21, a second temperature indicator 22, and a camera 23.

The first temperature indicator 21 is a piece of temperature indicating tape attached to the supply portion 10 of the steam trap 3, and changes its color at a first reference temperature $T_1$ set in advance for the supply portion 10. The second temperature indicator 22 is a piece of temperature indicating tape attached to the discharge portion 11 of the steam trap 3, and changes its color at a second reference temperature $T_2$ set in advance for the discharge portion 11.

Note that the temperature indicators 21 and 22 are not limited to temperature indicating tapes. Paints that change their colors according to temperature or components coated with these paints may be used as the temperature indicators 21 and 22.

Also, the camera 23 observes the colors of the first temperature indicator 21 and the second temperature indicator 22 and notifies the transmitter 24 of information on those colors. Meanwhile, if the steam trap 3 is provided in a dark area, lighting that illuminates the temperature indicators 21 and 22 may be provided to make it easier to observe the colors of the temperature indicators 21 and 22 with the camera 23.

Further, although the temperature indicators 21 and 22 are simultaneously observed with a single camera 23 in this example, a dedicated camera may be provided for each of the first temperature indicator 21 and the second temperature indicator 22.

When notified by the camera 23 of the information on the colors of the temperature indicators 21 and 22, the transmitter 24 wirelessly transmits the information on the colors as temperature information to the receiver 7 (see FIG. 1) with a transmission antenna.

The colors of the first temperature indicator 21 and the second temperature indicator 22 serve as indicators with which to determine whether an abnormality is present in the steam trap 3 as described below.

Figure 6:
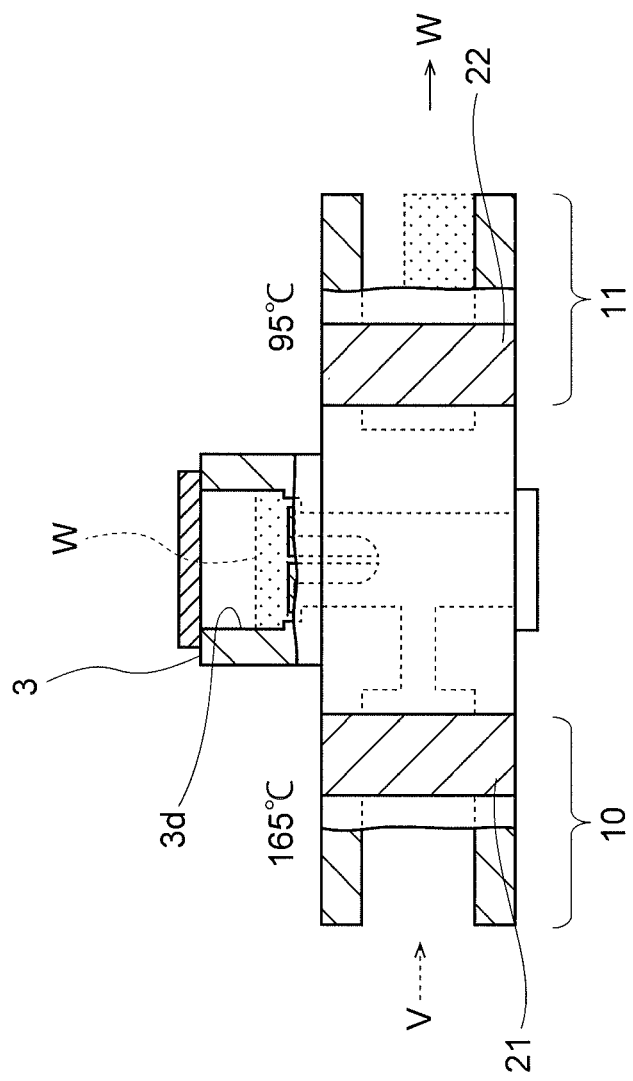
FIG. 6 is a partially cross-sectional side view of the steam trap according to the first embodiment in an ideal state without an abnormality.

FIG. 6 is a partially cross-sectional side view of the steam trap 3 in an ideal state without an abnormality. The following assumes a case where a water vapor V under a pressure of 0.7 MPaG and at a temperature of 170° C. is supplied to the supply portion 10. This also applies to FIGS. 7 and 8 to be mentioned later.

When there is no abnormality, the supply portion 10 is heated by the water vapor V while being slightly cooled by the ambient air. Thus, the temperature of the supply portion 10 is only slightly below the temperature of the water vapor V.

On the other hand, only the liquid water W is discharged from the discharge portion 11. Thus, the temperature of the discharge portion 11 is lower than a boiling point $T_v$ of water under the pressure on the water W. Note that the boiling point $T_v$ of water in the following refers to a boiling point with pressure taken into account as above.

Thus, when the temperature of the supply portion 10 is 165° C., which is slightly lower than the temperature of the water vapor V (170° C.), and the temperature of the discharge portion 11 is 95° C., which is lower than the boiling point $T_v$, as in FIG. 6, it means no abnormality in the steam trap 3.

Figure 7:
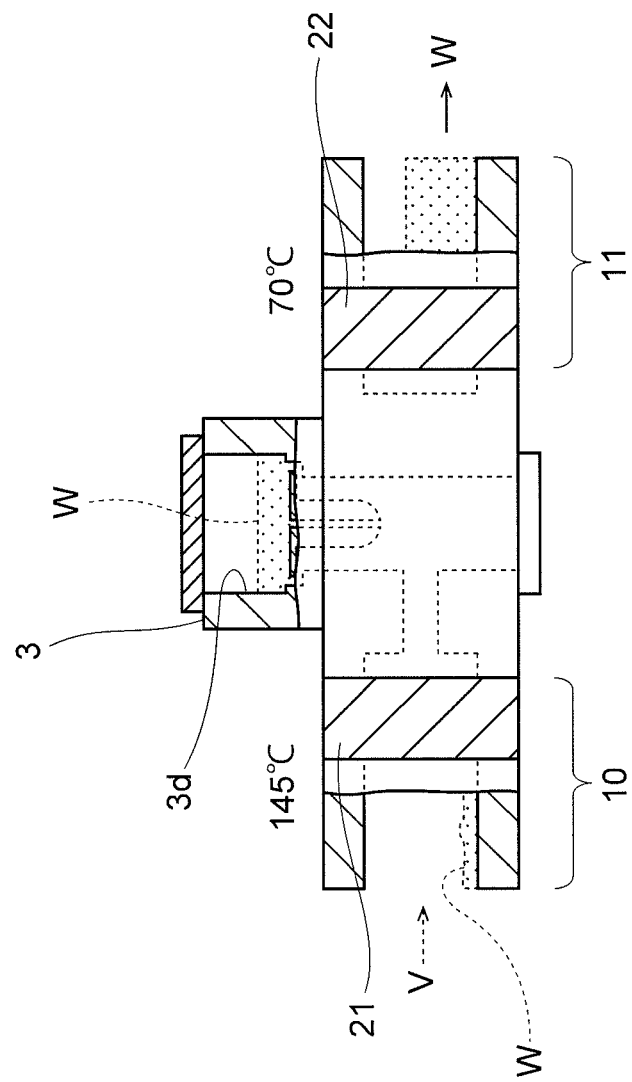
FIG. 7 is a partially cross-sectional side view of the steam trap according to the first embodiment with an abnormality occurring therein.

FIG. 7, on the other hand, is a partially cross-sectional side view of the steam trap 3 with an abnormality occurring therein. In the example of FIG. 7, liquid water W stagnates in the supply portion 10, so that the temperature of the supply portion 10 (145° C.) is well below the temperature of the vapor V (170° C.).

To detect such an abnormality, the first reference temperature $T_1$, at which the first temperature indicator 21 changes its color, may just need to be about 155° C., which is only certain degrees lower than the temperature of the vapor V to be supplied to the supply portion 10 (170° C.). Note that this temperature can be selected as appropriate according to the material of the pipe 5 and whether a heat insulating material is wound around the pipe 5. This also applies to temperatures to be described later including the first and second reference temperatures $T_1$ and $T_2$.

In this way, when the temperature of the supply portion 10 falls below the first reference temperature $T_1$, the first temperature indicator 21 changes its color. This enables the determiner 8 to determine which temperature is higher, the temperature of the supply portion 10 or the first reference temperature $T_1$, based on the information on the color of the first temperature indicator 21. If the temperature of the supply portion 10 is lower than the first reference temperature $T_1$, the determiner 8 determines that an abnormality is present in the steam trap 3. Upon receipt of this determination result, the notifier 9 notifies the administrator of the presence of the abnormality with a sound or a screen.

Upon receipt of the notice, the administrator replaces the nozzle 14 with one having a nozzle hole 14a (see FIG. 3) with a larger diameter than the current one. This can solve the stagnation of the water W in the supply portion 10 and thus solve the abnormality.

Note that if the water W stagnates in the supply portion 10 as in this example, the valve controller 17 having received the result of the determination by the determiner 8 may open the release valve 16 and release the water W from the release valve 16. In this way, the water W can be quickly discharged from the steam line before a worker replaces the nozzle 14. This can prevent the water W from causing the steam hammer phenomenon.

Meanwhile, the first reference temperature $T_1$ is, as described above, a temperature serving as a target point for determining that liquid water W stagnates in the supply portion 10. If this temperature is excessively low, there is a fear that the first temperature indicator 21 does not change its color although the water W stagnates in the supply portion 10, which leads to a failure to detect the abnormality. It is therefore preferable to keep the difference between the temperature of the vapor V and the first reference temperature $T_1$ within 10° C.

Figure 8:
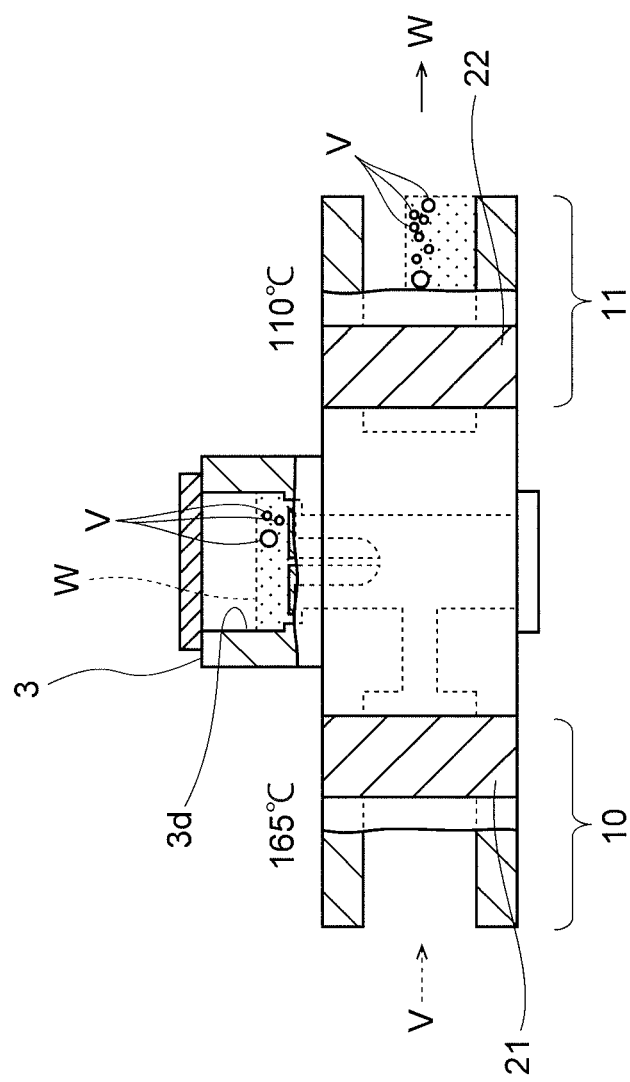
FIG. 8 is a partially cross-sectional side view of the steam trap according to the first embodiment with a different abnormality from that in FIG. 7 occurring therein.

Here, FIG. 8 is a partially cross-sectional side view of the steam trap 3 with a different abnormality from that in FIG. 7 occurring therein.

In the example of FIG. 8, the water vapor V is leaking to the discharge portion 11, and the temperature of the discharge portion 11 is 110° C., which is higher than the boiling point $T_v$. To detect such an abnormality, the second reference temperature $T_2$, at which the second temperature indicator 22 changes its color, may just need to be a predetermined temperature higher than the boiling point $T_v$. For example, it is preferable that the second reference temperature $T_2$ be 105° C., which is about 5° C. higher than the boiling point $T_v$ (100° C.), in a case where the discharge portion 11 is open to the atmosphere and the pressure inside the discharge portion 11 is the atmospheric pressure.

In this way, when the temperature of the discharge portion 11 exceeds the second reference temperature $T_2$, the second temperature indicator 22 changes its color. This enables the determiner 8 to determine which temperature is higher, the temperature of the discharge portion 11 or the second reference temperature $T_2$, based on the information on the color of the second temperature indicator 22. If the temperature of the discharge portion 11 is higher than the second reference temperature $T_2$, the determiner 8 determines that an abnormality is present in the steam trap 3. Upon receipt of this determination result, the notifier 9 notifies the administrator of the presence of the abnormality with a sound or a screen.

Upon receipt of the notice, the administrator replaces the nozzle 14 with one having a nozzle hole 14a (see FIG. 3) with a smaller diameter than the current one. This can stop the leakage of the vapor V to the discharge portion 11 and thus solve the abnormality.

Note that the second reference temperature $T_2$ is, as described above, a temperature serving as a target point for determining whether the vapor V is leaking to the discharge portion 11. If this temperature is excessively high, there is a fear that the second temperature indicator 22 does not change its color although the vapor V is leaking to the discharge portion 11, which will lead to a failure to detect the abnormality. It is therefore preferable to keep the difference between the second reference temperature $T_2$ and the boiling point $T_v$ of water within 10° C.

FIG. 9 is a diagram illustrating a determination table with which the determiner 8 determines whether an abnormality is present based on the first reference temperature $T_1$ and the second reference temperature $T_2$ described above. According to this embodiment described above, the transmitter 24 transmits temperature information to the receiver 7. Thus, even when the steam traps 3 are scattered over the factory, the determiner 8 can determine whether abnormalities are present in the steam traps 3 based on this temperature information. In this way, a worker does not need to inspect the steam traps 3 himself or herself in the field. This facilitates inspection of the steam traps 3.

Moreover, whether an abnormality is present is determined accurately since the reference temperatures $T_1$ and $T_2$ serving as criteria for determining whether an abnormality is present are set in advance.

Further, the temperature information on each steam trap 3 is wirelessly transmitted to the receiver 7 by the corresponding temperature measurer 20. Thus, even when the steam traps 3 are scattered over a large factory, each temperature measurer 20 and the receiver 7 do not need to be connected by a cable, which makes the installation of the temperature measurer 20 easy.

This embodiment has been described in detail above, but this embodiment is not limited to the above. For example, a case where the temperature measurer 20 performs wireless transmission has been exemplarily described above. However, the temperature measurer 20 and the receiver 7 may be connected by a cable if the trouble of connecting the temperature measurer 20 and the receiver 7 by a cable is not a problem.

Second Embodiment

In the first embodiment, the colors of the first temperature indicator 21 and the second temperature indicator 22 are utilized as temperature information. In this embodiment, temperatures measured with thermometers as below are utilized as temperature information.

Figure 10:
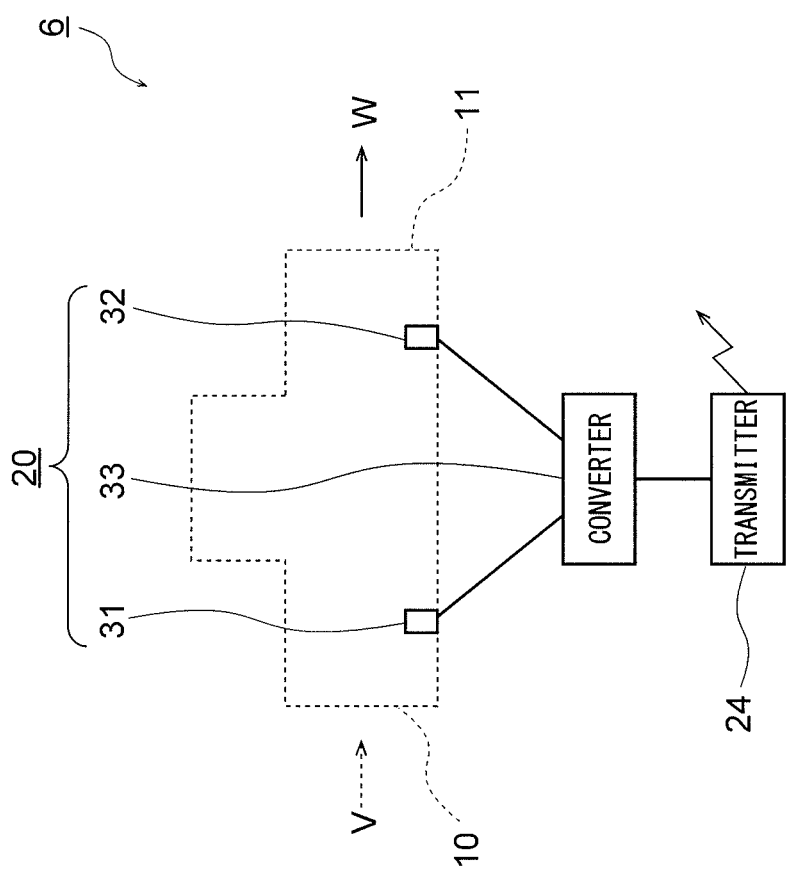
FIG. 10 is a configuration diagram of a transmission unit according to a second embodiment.

FIG. 10 is a configuration diagram of a transmission unit 6 according to this embodiment. Note that the same components in FIG. 10 as those described in the first embodiment are designated by the same reference signs as those in the first embodiment, and description thereof is omitted below.

As illustrated in FIG. 10, the transmission unit 6 has a temperature measurer 20 and a transmitter 24, as in the first embodiment. Of these, the temperature measurer 20 comprises a first thermometer 31, a second thermometer 32, and a converter 33.

The first thermometer 31 and the second thermometer 32 are, for example, thermocouples that generate electromotive force corresponding to temperature, and are fixed to a supply portion 10 and a discharge portion 11, respectively.

The converter 33 converts the electromotive forces generated by the thermometers 31 and 32 into temperatures, and notifies the transmitter 24 of them as temperature information.

When notified by the converter 33 of the temperature information, the transmitter 24 wirelessly transmits the temperature information to a receiver 7 (see FIG. 1).

In the case of using these thermometers 31 and 32 too, a determiner 8 determines whether an abnormality is present in accordance with the determination table in FIG. 9, and a notifier 9 can issue a notice if an abnormality is present.

Modification

In the case of the nozzle steam trap 3, it is possible to detect an abnormality in the steam trap 3 based solely on which temperature is higher, the temperature of each of the supply portion 10 and the discharge portion 11 or the corresponding reference temperature, without monitoring the changes over time in these temperatures.

Such an advantage may be utilized such that, as described below, only the discharge portion 11 is provided with the second thermometer 32, and an abnormality in the steam trap 3 is detected based solely on the temperature of the discharge portion 11.

Figure 11A:
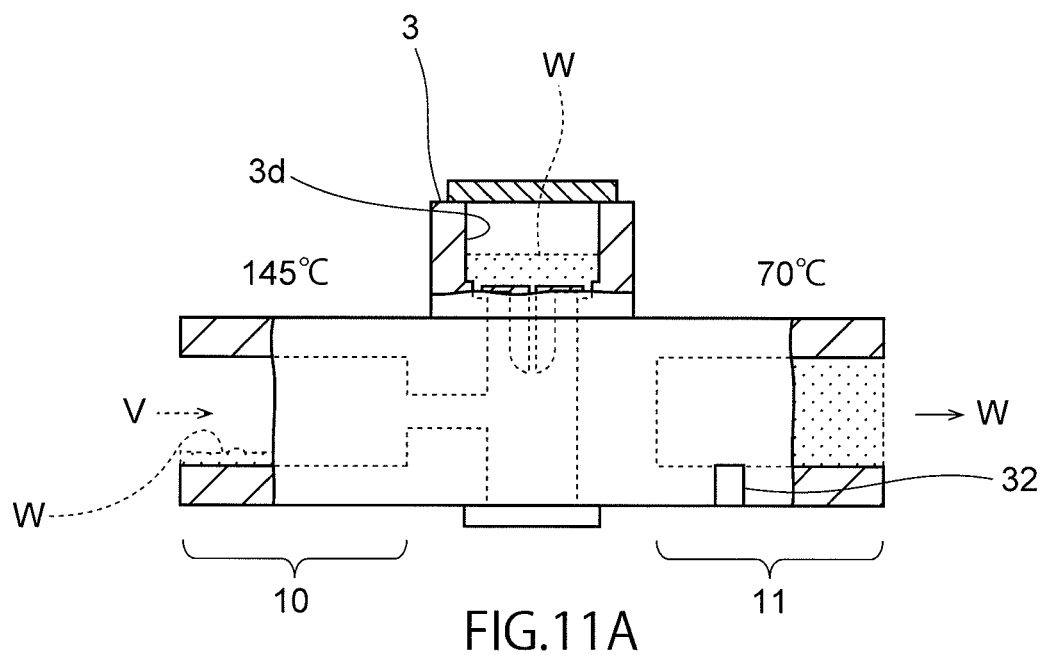
FIG. 11A is a cross-sectional view of a steam trap according to a modification of the second embodiment with an abnormality occurring therein.
Figure 11B:
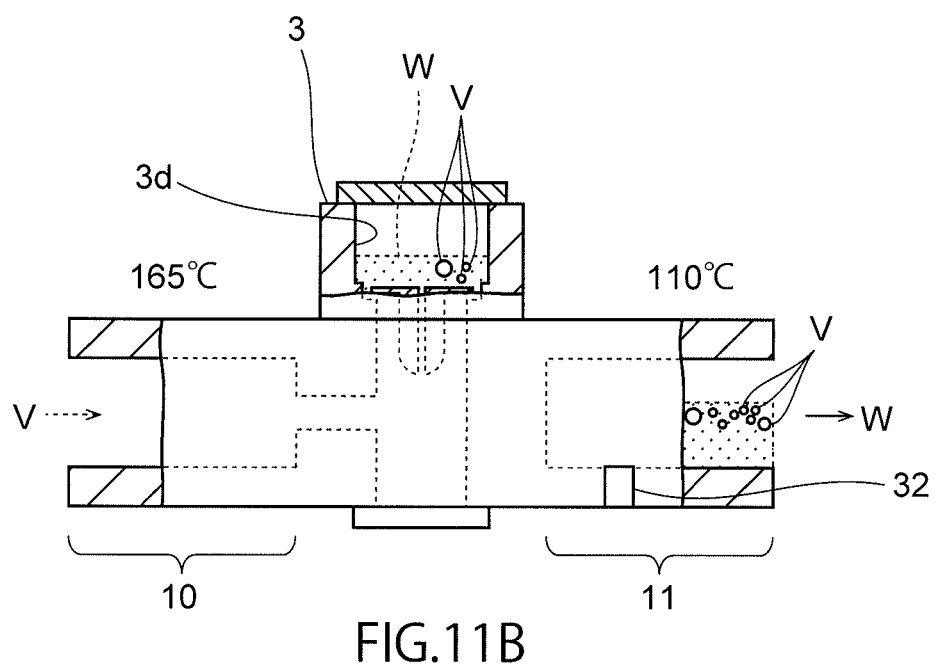
FIG. 11B is a cross-sectional view of a steam trap according to the modification of the second embodiment with a different abnormality from that in FIG. 11A occurring therein.

FIGS. 11A and 11B are cross-sectional views of a steam trap 3 according to a modification of the second embodiment.

In the example of FIG. 11A, as in FIG. 7, water W stagnates in the supply portion 10, so that the temperature of the supply portion 10 has fallen below the temperature of vapor V, as described earlier. In this case, the temperature of the discharge portion 11 also falls due to the stagnant water W, and this temperature falls below the boiling point $T_v$ of water.

In the example of FIG. 11B, on the other hand, as in FIG. 8, the vapor V is leaking to the discharge portion 11, so that the temperature of the discharge portion 11 has risen above the boiling point $T_v$ of water.

Thus, the abnormalities in FIGS. 11A and 11B can be detected even by providing only the discharge portion 11 with the second thermometer 32, as in this modification, and measuring only the temperature of the discharge portion 11.

For example, to detect an abnormality due to stagnation of water W as in FIG. 11A, a first discharge-side reference temperature $T_{e1}$ (e.g., 70° C. to 90° C.) lower than the boiling point $T_v$ of water may be set for the discharge portion 11 in advance. Moreover, to detect an abnormality due to leakage of vapor V as in FIG. 11B, a second discharge-side reference temperature Tee (e.g., 100° C. to 120° C.) higher than the boiling point $T_v$ of water may be set for the discharge portion 11 in advance.

Note that, like the first and second reference temperatures $T_1$ and $T_2$, the first and second discharge-side reference temperatures $T_{e1}$ and $T_{e2}$ can be selected as appropriate according to the material of a pipe 5 and whether a heat insulating material is wound around the pipe 5.

Then, the determiner 8 may determine that an abnormality is present in the steam trap 3 when the temperature of the discharge portion 11 is lower than the first discharge-side reference temperature $T_{e1}$ (FIG. 11A) or when this temperature of the discharge portion 11 is higher than the second discharge-side reference temperature $T_{e2}$ (FIG. 11B).

Monitoring only the temperature of the discharge portion 11 as above can make the apparatus configuration simple as compared to the case of monitoring both of the temperatures of the supply portion 10 and the discharge portion 11.

Third Embodiment

In this embodiment, the temperature of each steam trap 3 is measured with an infrared sensor as below.

Figure 12:
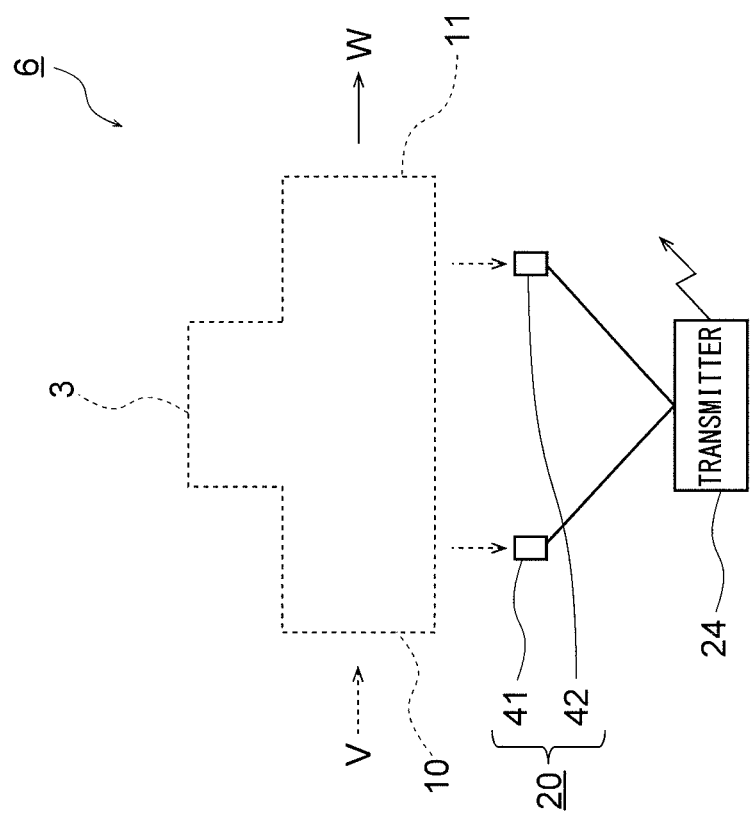
FIG. 12 is a configuration diagram of a transmission unit according to a third embodiment.

FIG. 12 is a configuration diagram of a transmission unit 6 according to this embodiment. Note that the same components in FIG. 12 as those described in the first embodiment and the second embodiment are designated by the same reference signs as those in these embodiments, and description thereof is omitted below.

As illustrated in FIG. 12, the transmission unit 6 has a temperature measurer 20 and a transmitter 24, as in the first embodiment and the second embodiment. Of these, the temperature measurer 20 comprises a first infrared sensor 41 and a second infrared sensor 42.

The first infrared sensor 41 receives infrared rays emitted from a supply portion 10, and measures the temperature of the supply portion 10 based on these infrared rays. The second infrared sensor 42 receives infrared rays emitted from a discharge portion 11, and measures the temperature of the discharge portion 11 based on these infrared rays. The infrared sensors 41 and 42 then notify the transmitter 24 of the temperatures which they measured as temperature information.

Note that each of the infrared sensors 41 and 42 may be an infrared ray receiving element including only one pixel, or an infrared image sensor including a plurality of pixels.

When notified by the infrared sensors 41 and 42 of the temperature information, the transmitter 24 wirelessly transmits the temperature information to a receiver 7 (see FIG. 1).

In the case of using the infrared sensors 41 and 42 too, a determiner 8 determines whether an abnormality is present in accordance with the determination table in FIG. 9, and a notifier 9 can issue a notice if an abnormality is present.

Fourth Embodiment

In the first to third embodiments, nozzle steam traps are used as the steam traps 3. In this embodiment, a mechanical steam trap including a mechanical movable portion as described below is used.

Figure 13:
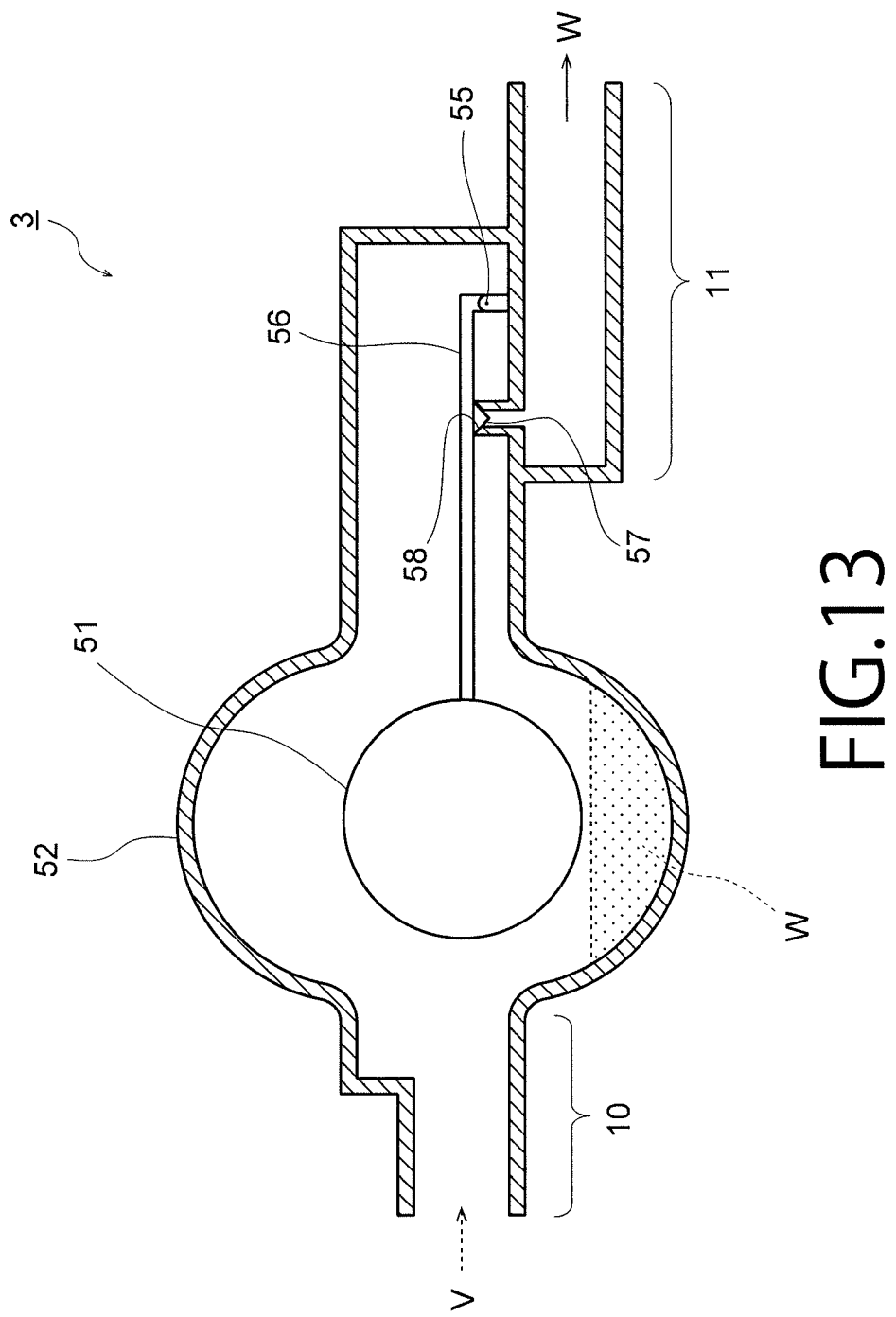
FIG. 13 is a cross-sectional view of a steam trap according to a fourth embodiment.

FIG. 13 is a cross-sectional view of a steam trap 3 according to this embodiment. This steam trap 3 is a float steam trap and includes a float 51 and a body 52 accommodating it.

The body 52 is provided with a supply portion 10 into which water vapor V is supplied, and a discharge portion 11 which discharges liquid water W contained in the water vapor V. At a portion inside the body 52 near the discharge portion 11, an arm 56 is provided which is freely pivotable about a fulcrum 55.

The above-mentioned float 51 is fixed to one end of the arm 56. This makes the float 51 freely pivotable about the fulcrum 55. Furthermore, a valve body 57 is fixed to an intermediate portion of this arm 56, and a valve seat 58 provided in the discharge portion 11 is closed by the valve body 57.

In such a steam trap 3, as the level of water W stored in the body 52 rises, the float 51 is displaced upward accordingly. As a result, a gap is formed between the valve seat 58 and the valve body 57, and the water W is discharged from the discharge portion 11 through this gap.

As this state continues for a while, the water level inside the body 52 drops, so that the valve seat 58 is closed by the valve body 57 again, preventing discharge of the vapor V from the discharge portion 11.

As described above, the steam trap 3 according to this embodiment intermittently discharges the water W from the discharge portion 11 during a normal state. The intervals at which the water W is released depends on the specifications of the steam trap 3. For example, the water W is released from the steam trap 3 once every 5 seconds to 10 minutes.

Next, abnormalities that occur in this steam trap 3 will be described.

Figure 14:
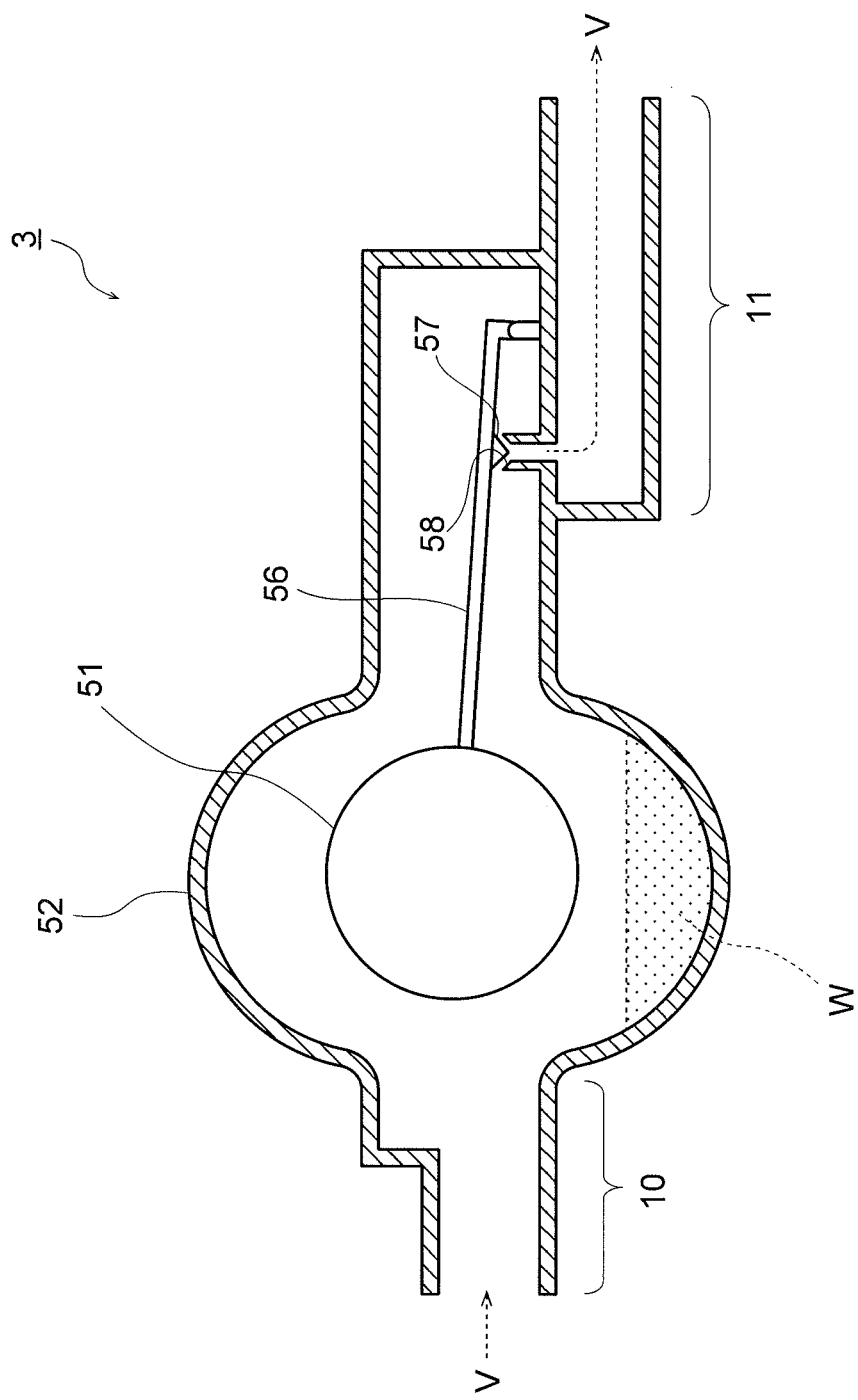
FIG. 14 is a cross-sectional view of the steam trap according to the fourth embodiment with an abnormality occurring therein.

FIG. 14 is a cross-sectional view of the steam trap 3 with an abnormality occurring therein. In the example of FIG. 14, the level of the water W stored in the body 52 is low but a gap is formed between the valve body 57 and the valve seat 58 due to rust attached to them, so that the vapor V is leaking to the discharge portion 11 through this gap.

In such a case, the temperatures of the supply portion 10 and the discharge portion 11 do not change over time, and the supply portion 10 and the discharge portion 11 are both at substantially the same temperature as the vapor V.

Figure 15:
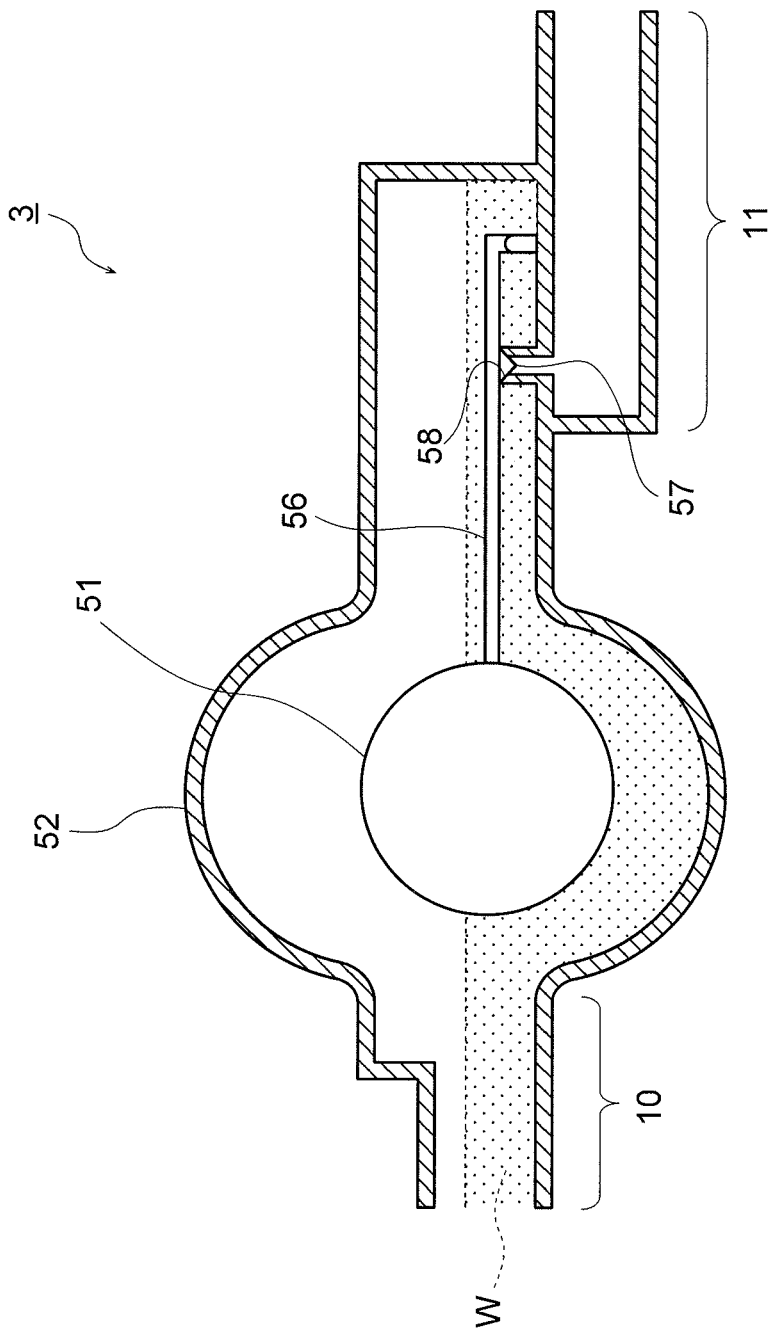
FIG. 15 is a cross-sectional view of the steam trap according to the fourth embodiment with a different abnormality from that in FIG. 14 occurring therein.

FIG. 15, on the other hand, is a cross-sectional view of the steam trap 3 with a different abnormality from that in FIG. 14 occurring therein. In the example of FIG. 15, the float 51 has stopped moving up or down for some reason, causing the valve body 57 to close the valve seat 58 all the time.

In such a case, the amount of the water W inside the body 52 increases over time. Consequently, the supply portion 10 is cooled by this water W, and the temperature of the supply portion 10 falls over time.

Also, the vapor V is not discharged to the discharge portion 11. Consequently, the discharge portion 11 is not heated by the vapor V, and the temperature of the discharge portion 11 falls over time as well.

Thus, in the case of the mechanical steam trap 3, abnormalities can be detected by monitoring the changes over time in the temperatures of the supply portion 10 and the discharge portion 11.

Figure 16:
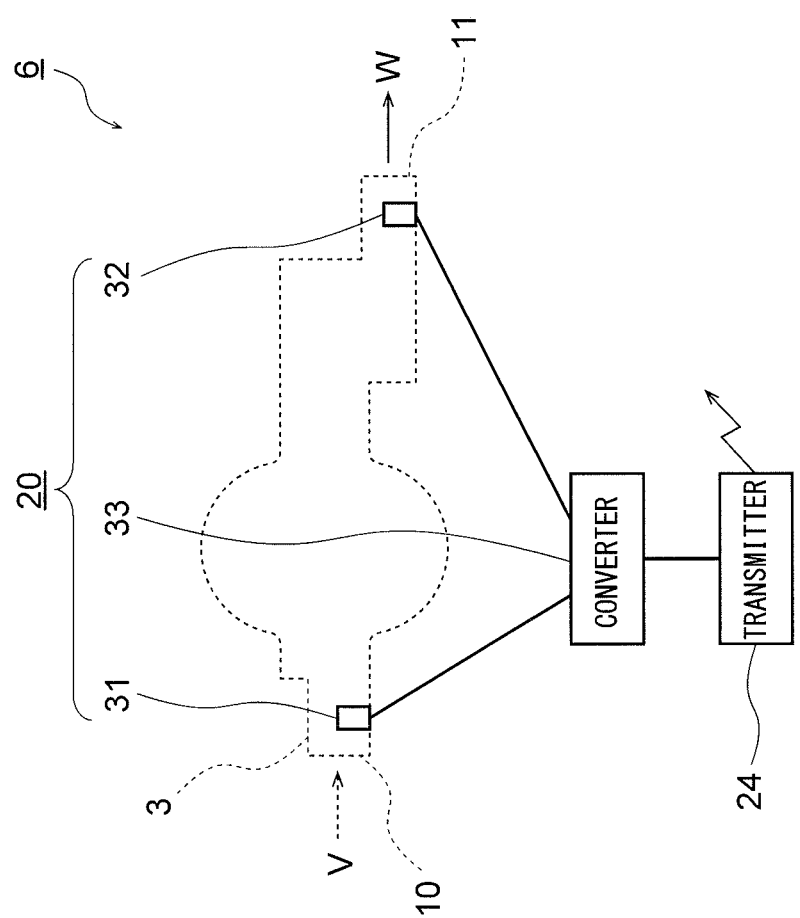
FIG. 16 is a configuration diagram of a transmission unit according to the fourth embodiment.

FIG. 16 is a configuration diagram of a transmission unit 6 according to this embodiment. Note that the same components in FIG. 16 as those described in the first to third embodiments are designated by the same reference signs as those in these embodiments, and description thereof is omitted below. This also applies to FIG. 17 to be mentioned later.

As illustrated in FIG. 16, as in the second embodiment, the transmission unit 6 is provided with a first thermometer 31 and a second thermometer 32. Temperature information containing temperatures measured by these thermometers 31 and 32 is wirelessly transmitted from a transmitter 24.

Note that instead of measuring the temperatures of the steam trap 3 with the thermometers 31 and 32 as above, the temperatures of the steam trap 3 may be measured with the infrared sensors 41 and 42 described in the third embodiment (see FIG. 12).

Figure 17:
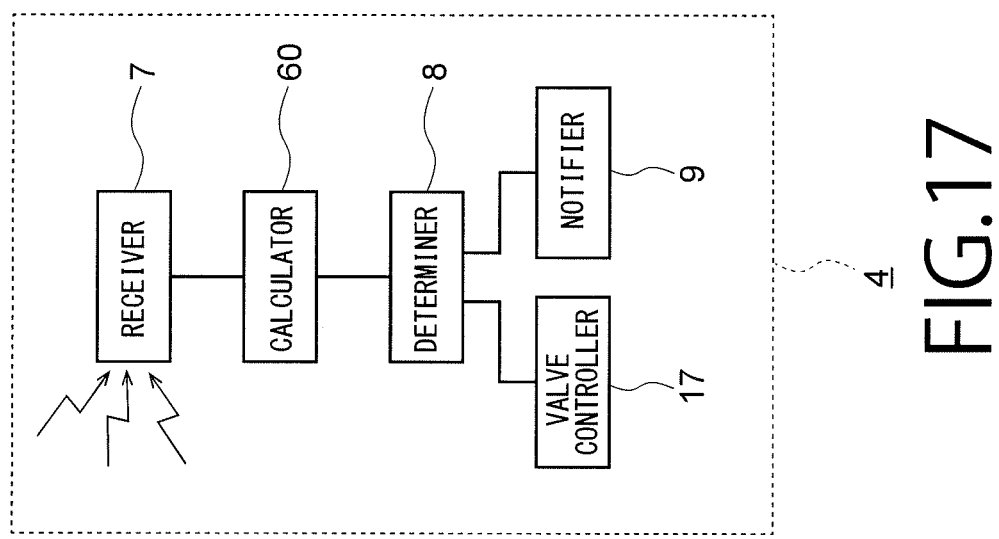
FIG. 17 is a configuration diagram of a monitoring unit according to the fourth embodiment.

FIG. 17 is a configuration diagram of the monitoring unit according to this embodiment. As illustrated in FIG. 17, a monitoring unit 4 according to this embodiment includes a calculator 60 as well as the receiver 7, the determiner 8, the notifier 9, and the valve controller 17 described in the first embodiment.

Of these, the receiver 7 receives the temperature information wirelessly transmitted from the transmission unit 6, and notifies the calculator 60 of the temperature information.

Based on the temperature information which the calculator 60 is notified of, the calculator 60 calculates an amount $\Delta T_s$ of change over time in the temperature of the supply portion 10 in a predetermined time interval $\Delta t$ and an amount $\Delta T_e$ of change over time in the temperature of the discharge portion 11 in the predetermined time interval $\Delta t$. Note that the time interval $\Delta t$ is not particularly limited. For example, it is a value of about 10 seconds to 30 seconds.

The hardware configuration of the calculator 60 is not particularly limited either. Like the determiner 8, the calculator 60 is implemented with a processor such as a CPU and a memory cooperating with each other to execute a program.

The determiner 8 then determines whether an abnormality is present in the steam trap 3 based on the amounts $\Delta T_s$ and $\Delta T_e$ of changes over time in the temperatures calculated by the calculator 60.

The criterion for this determination is selected as appropriate according to the abnormality to be detected.

For example, in the case of an abnormality as in FIG. 14 in which the vapor V keeps leaking from the discharge portion 11, the temperature of the supply portion 10 and the temperature of the discharge portion 11 become substantially the same as the temperature of the vapor V, and the temperatures of the supply portion 10 and the discharge portion 11 hardly change over time, as described earlier. Thus, to detect this abnormality, a first threshold value $T_1$ for temperature change is set in advance, and the determiner 8 determines that the abnormality is present if a state where the absolute values of the amounts $\Delta T_s$ and $\Delta T_e$ of changes over time in the temperatures are both lower than the first threshold value $T_1$ continues over a predetermined time period (e.g., 5 minutes to 10 minutes). Note that this time period is not limited to the above, and can be set as appropriate according to the position where the steam trap 3 is installed and the amount of liquid water W to be discharged from the steam trap 3.

On the other hand, in the case of an abnormality as in FIG. 15 in which water W accumulates in the steam trap 3, the temperatures of the supply portion 10 and the discharge portion 11 fall over time, as described earlier. Thus, to detect this abnormality, a second threshold value $T_2$ for determining that temperature changes are occurring in the negative direction is set in advance, and the determiner 8 determines that the abnormality is present if a state where the absolute values of the amounts $\Delta T_s$ and $\Delta T_e$ of changes over time in the temperatures of the supply portion 10 and the discharge portion 11 are lower than the second threshold value $T_2$ continues over a predetermined time period (e.g., 5 minutes to 10 minutes). This time period too is not limited to the above, and can be set as appropriate according to the position where the steam trap 3 is installed and the amount of liquid water W to be discharged from the steam trap 3.

Then, if it is thus determined that an abnormality is present, the notifier 9 issues a notice indicating that the abnormality is present in the steam trap 3. Note that in the case of an abnormality as in FIG. 15 in which water W accumulates in the steam trap 3, the valve controller 17 having received the result of the determination by the determiner 8 may open a release valve 16 (see FIG. 1) and release the water W from the release valve 16, as in the first embodiment.

According to this embodiment described above, even when the monitoring target is the mechanical steam trap 3, it is possible to determine whether an abnormality is present based on the changes in the temperatures of the supply portion 10 and the discharge portion 11 of the steam trap 3.

Note that the mechanical steam trap is not limited to the float steam trap described above. For example, any one of a bimetal steam trap 3, a bucket steam trap 3, and a disc steam trap 3 may be used.

Fifth Embodiment

In this embodiment, a description will be given of a component that enables a worker to easily find an abnormality in a steam trap without having to use a monitoring system such as those in the first to fifth embodiments.

FIG. 18 is a cross-sectional view of the component according to this embodiment. Note that the same components in FIG. 18 as those described in the first embodiment are designated by the same reference signs as those in the first embodiment, and description thereof is omitted below.

As illustrated in FIG. 18, this component 70 has a steam trap 3, a first temperature indicator 21, and a second temperature indicator 22.

Of these, the steam trap 3 is the nozzle steam trap described in the first embodiment.

Further, the first temperature indicator 21 is a piece of temperature indicating tape attached to the supply portion 10 of the steam trap 3, and changes its color at the first reference temperature $T_1$ described in the first embodiment. Furthermore, the second temperature indicator 22 is a piece of temperature indicating tape attached to the discharge portion 11 of the steam trap 3, and changes its color at the second reference temperature $T_2$ described in the first embodiment.

In this embodiment, a worker visually observes the color of the first temperature indicator 21, and the worker figures out whether the temperature of the supply portion 10 is higher than the first reference temperature $T_1$ based on this color. Similarly, the worker visually observes the color of the second temperature indicator 22 as well, and the worker figures out whether the temperature of the discharge portion 11 is higher than the second reference temperature $T_2$ based on this color.

Then, after thus figuring out the states, the worker refers to the table in FIG. 9 and determines whether an abnormality is present in the steam trap 3.

According to this embodiment described above, a worker can easily determine whether an abnormality is present in the steam trap 3 only by observing the colors of the temperature indicators 21 and 22, without having to bring a thermometer into contact with the steam trap 3. This can reduce the burden on the worker.

While several embodiments of the invention were described in the foregoing detailed description, those skilled in the art may make modifications and alterations to these embodiments without departing from the scope and spirit of the invention. Accordingly, the foregoing description is intended to be illustrative rather than restrictive.

What is claimed is:
1. A monitoring system comprising:
a nozzle steam trap including a supply portion into which water vapor is supplied, and a discharge portion which discharges liquid water contained in the water vapor;
a temperature measurer that measures a temperature of the discharge portion;

a transmitter that transmits temperature information containing the temperature measured by the temperature measurer;
a receiver that receives the temperature information;
a determiner that determines whether an abnormality is present in the nozzle steam trap based on the temperature information; and
a notifier that issues a notice when the determiner determines that the abnormality is present;
wherein the nozzle steam trap has:
   a nozzle including a nozzle hole from which the water vapor and the liquid water are jetted;
   a water storage portion that stores the liquid water jetted from the nozzle hole and includes an opening; and
   a channel that guides the liquid water to the discharge portion from the opening, and
wherein, with a first discharge-side reference temperature lower than a boiling point of the water and a second discharge-side reference temperature higher than the boiling point of the water being set for the discharge portion, the determiner determines that the abnormality is present when the temperature of the discharge portion contained in the temperature information is lower than the first discharge-side reference temperature or higher than the second discharge-side reference temperature.

2. The monitoring system according to claim 1, wherein the temperature measurer has a temperature indicator that changes a color thereof at reference temperatures including the first discharge-side reference temperature and the second discharge-side reference temperature, and wherein the temperature information is information on the color of the temperature indicator.

3. The monitoring system according to claim 1, wherein the temperature measurer has an infrared sensor that receives an infrared ray emitted from the discharge portion and measures the temperature based on the infrared ray.

4. The monitoring system according to claim 1, wherein the temperature measurer has a thermometer that is fixed to the discharge portion and measures the temperature.

5. The monitoring system according to claim 1, wherein the temperature measurer further measures a temperature of the supply portion, and wherein the determiner further determines whether an abnormality is present based on whether or not the temperature of the supply portion contained in the temperature information and measured by the temperature measurer is lower than a reference temperature set in advance for the supply portion.

6. The monitoring system according to claim 2, wherein the temperature measurer further measures a temperature of the supply portion, and wherein the determiner further determines whether an abnormality is present based on whether or not the temperature of the supply portion contained in the temperature information and measured by the temperature measurer is lower than a reference temperature set in advance for the supply portion.

7. The monitoring system according to claim 3, wherein the temperature measurer further measures a temperature of the supply portion, and wherein the determiner further determines whether an abnormality is present based on whether or not the temperature of the supply portion contained in the temperature information and measured by the temperature measurer is lower than a reference temperature set in advance for the supply portion.

8. The monitoring system according to claim 4, wherein the temperature measurer further measures a temperature of the supply portion, and wherein the determiner further determines whether an abnormality is present based on whether or not the temperature of the supply portion contained in the temperature information and measured by the temperature measurer is lower than a reference temperature set in advance for the supply portion.

9. The monitoring system according to claim 1, further comprising a calculator that calculates an amount of change over time in the temperature contained in the temperature information, wherein the determiner determines whether there is the abnormality based further on the amount of change over time calculated by the calculator.

10. The monitoring system according to claim 5, further comprising a calculator that calculates an amount of change over time in the temperature contained in the temperature information, wherein the determiner determines whether there is the abnormality based further on the amount of change over time calculated by the calculator.

11. The monitoring system according to claim 1, further comprising:
   piping connected to the supply portion;
   a release valve provided to the piping; and
   a valve controller that, when the determiner determines that the abnormality is present, controls the release valve to release the liquid water to an outside of the piping through the release valve.

12. The monitoring system according to claim 2, further comprising:
   piping connected to the supply portion;
   a release valve provided to the piping; and
   a valve controller that, when the determiner determines that the abnormality is present, controls the release valve to release the liquid water to an outside of the piping through the release valve.

13. The monitoring system according to claim 3, further comprising:
   piping connected to the supply portion;
   a release valve provided to the piping; and
   a valve controller that, when the determiner determines that the abnormality is present, controls the release valve to release the liquid water to an outside of the piping through the release valve.

14. The monitoring system according to claim 4, further comprising:
   piping connected to the supply portion;
   a release valve provided to the piping; and
   a valve controller that, when the determiner determines that the abnormality is present, controls the release valve to release the liquid water to an outside of the piping through the release valve.

15. The monitoring system according to claim 5, further comprising:
   piping connected to the supply portion;
   a release valve provided to the piping; and
   a valve controller that, when the determiner determines that the abnormality is present, controls the release valve to release the liquid water to an outside of the piping through the release valve.

16. The monitoring system according to claim 6, further comprising:
   piping connected to the supply portion;
   a release valve provided to the piping; and
   a valve controller that, when the determiner determines that the abnormality is present, controls the release valve to release the liquid water to an outside of the piping through the release valve.

17. The monitoring system according to claim 7, further comprising:
 piping connected to the supply portion;
 a release valve provided to the piping; and
 a valve controller that, when the determiner determines that the abnormality is present, controls the release valve to release the liquid water to an outside of the piping through the release valve.

18. The monitoring system according to claim 8, further comprising:
 piping connected to the supply portion;
 a release valve provided to the piping; and
 a valve controller that, when the determiner determines that the abnormality is present, controls the release valve to release the liquid water to an outside of the piping through the release valve.

19. The monitoring system according to claim 9, further comprising:
 piping connected to the supply portion;
 a release valve provided to the piping; and
 a valve controller that, when the determiner determines that the abnormality is present, controls the release valve to release the liquid water to an outside of the piping through the release valve.

20. The monitoring system according to claim 10, further comprising:
 piping connected to the supply portion;
 a release valve provided to the piping; and
 a valve controller that, when the determiner determines that the abnormality is present, controls the release valve to release the liquid water to an outside of the piping through the release valve.

* * * * *